United States Patent [19]
Bardagi et al.

[11] Patent Number: 6,082,669
[45] Date of Patent: Jul. 4, 2000

[54] SYSTEM FOR THE ADMISSION OF AIR INTO A WORKING SECTION OF A GAS TURBINE ENGINE

[75] Inventors: Thierry Pascal Bardagi, Evry; Gérard Ernest André Jourdain, Saintry, both of France

[73] Assignee: Societe Nationale d'Etude et de Construction de Moteurs d'Aviation "Snecma", Paris, France

[21] Appl. No.: 09/071,157

[22] Filed: May 4, 1998

[30] Foreign Application Priority Data

May 7, 1997 [FR] France ................................. 97 05619

[51] Int. Cl.$^7$ .................................................. B64B 1/24
[52] U.S. Cl. .................................................... 244/53 B
[58] Field of Search ................... 244/130, 208, 244/209, 53 B; 137/15.1, 15.2; 60/226

[56] References Cited

U.S. PATENT DOCUMENTS

| | | |
|---|---|---|
| 3,503,211 | 3/1970 | Medawar et al. . |
| 3,511,055 | 5/1970 | Timms . |
| 3,659,424 | 5/1972 | Polk, Jr. ............................. 244/53 B |
| 3,991,782 | 11/1976 | Schwarzler ............................. 137/15.1 |
| 4,022,948 | 5/1977 | Smith et al. . |
| 4,137,711 | 2/1979 | Montgomery . |
| 4,278,220 | 7/1981 | Johnston et al. . |
| 4,371,132 | 2/1983 | Woodward ............................. 244/53 B |
| 4,418,879 | 12/1983 | Vanderleest ............................. 244/53 B |

FOREIGN PATENT DOCUMENTS

| | | |
|---|---|---|
| 966 975 | 10/1950 | France . |
| 2 476 743 | 8/1981 | France . |
| 19 44 472 | 3/1971 | Germany . |
| 39 42 323 | 6/1991 | Germany . |
| 257 935 | 5/1949 | Switzerland . |

*Primary Examiner*—Peter M. Poon
*Assistant Examiner*—Charles R. Ducker, Jr.
*Attorney, Agent, or Firm*—Oblon, Spivak, McClelland, Maier & Neustadt, P.C.

[57] ABSTRACT

The system (13) for admitting external air (12) into a working section (11) of a gas turbine engine through a jacket (10) of the working section is characterised by the combination of doors (15) sliding towards the front (ramps) and rotating doors (14). The ramps (15) are fitted with grooved lateral arms (30) in which run wheels mounted on the doors (14). When they reach an ascending part (33) of the grooves (31) after sufficient movement of the ramps (15) towards the front, they are caused to rise, which opens the doors (14). This system can be used on double flow gas turbine engines for supersonic aircraft.

3 Claims, 8 Drawing Sheets

SYSTEM FOR THE ADMISSION OF AIR INTO A WORKING SECTION OF A GAS TURBINE ENGINE

DESCRIPTION

The invention relates to a system for the admission of air into a gas turbine engine.

Certain aircraft, particularly supersonic aircraft, are fitted with special gas turbine engines with double air supply: the ordinary supply which occurs through the front of the working section and which is only in action during flight at a stable speed, must be complemented by a secondary air supply on take-off and when the aircraft is climbing. This secondary air supply is brought about by clearing the openings of the jacket (called the nacelle) which surrounds the working section, to allow the surrounding air to enter the working section through the side. Movable doors, which cover the openings when ordinary supply is sufficient, are moved in order to do this.

Many kinds of doors have been designed. One may mention firstly doors called "ramps" which run on slides along the nacelle in order to clear the openings, but their essential disadvantage is that they are not capable of guiding the air, which circulates over the nacelle and in front of the openings without being encouraged to pass through them: the air going into the working section is not very great unless the doors are given a large surface area and must then be displaced over a greater length; the device becomes bulky and the engine more noisy, since the sound is propagated more easily through these doors which vibrate easily.

Another known design consists of replacing the sliding doors with rotating doors called "scoops" and are hinged to the nacelle by their back edge. These doors open towards the exterior of the working section and are then skewed which allows them to catch a large quantity of air and direct it into the openings of the nacelle, which extend in front of them and to their foot, and into the working section. Their disadvantage is that they produce a large aerodynamic drag force which reduces the performance of the motor, particularly at high speeds. The scoops must then be partially drawn in which reduces the area of the opening through which air is entering the nacelle and the effectiveness of the guiding effect. This design therefore becomes inadequate.

Figure 1:
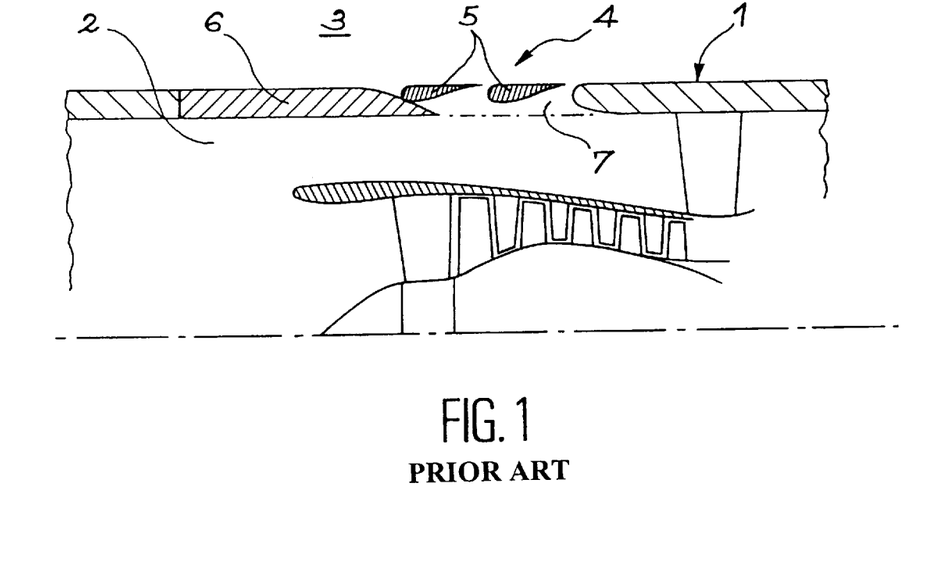
FIGS. 1 and 2, already described, illustrate an air admission system of the prior art in the closed and in the open positions.
Figure 2:
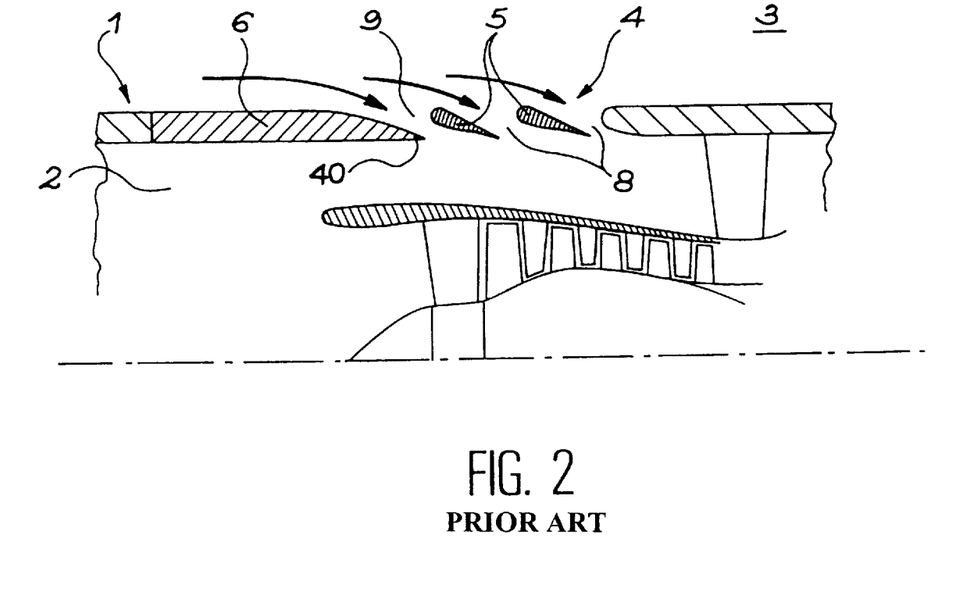
Figure 3:
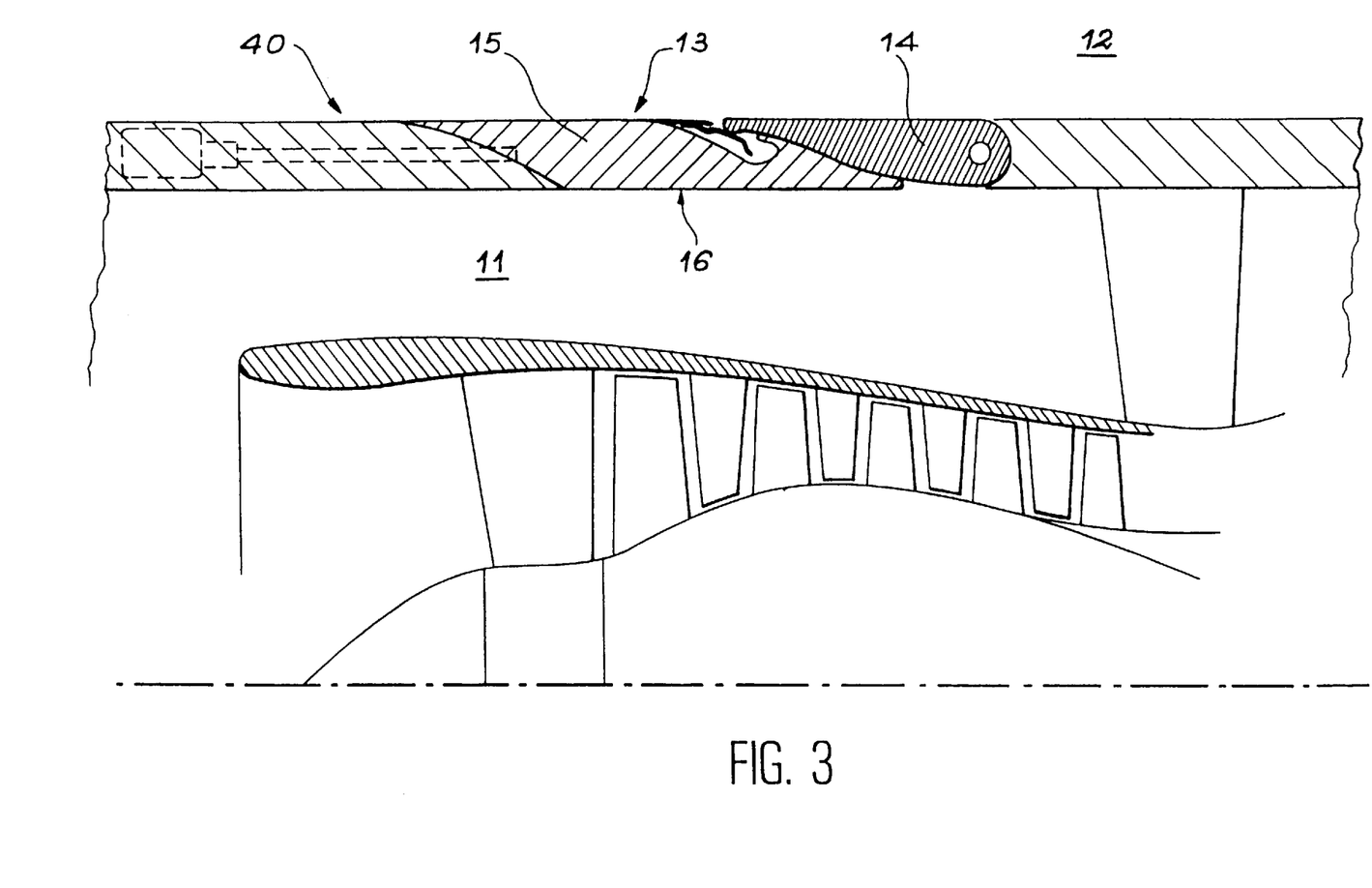
FIG. 3 illustrates the air admission system conforming to the invention in the closed position.
Figure 4:
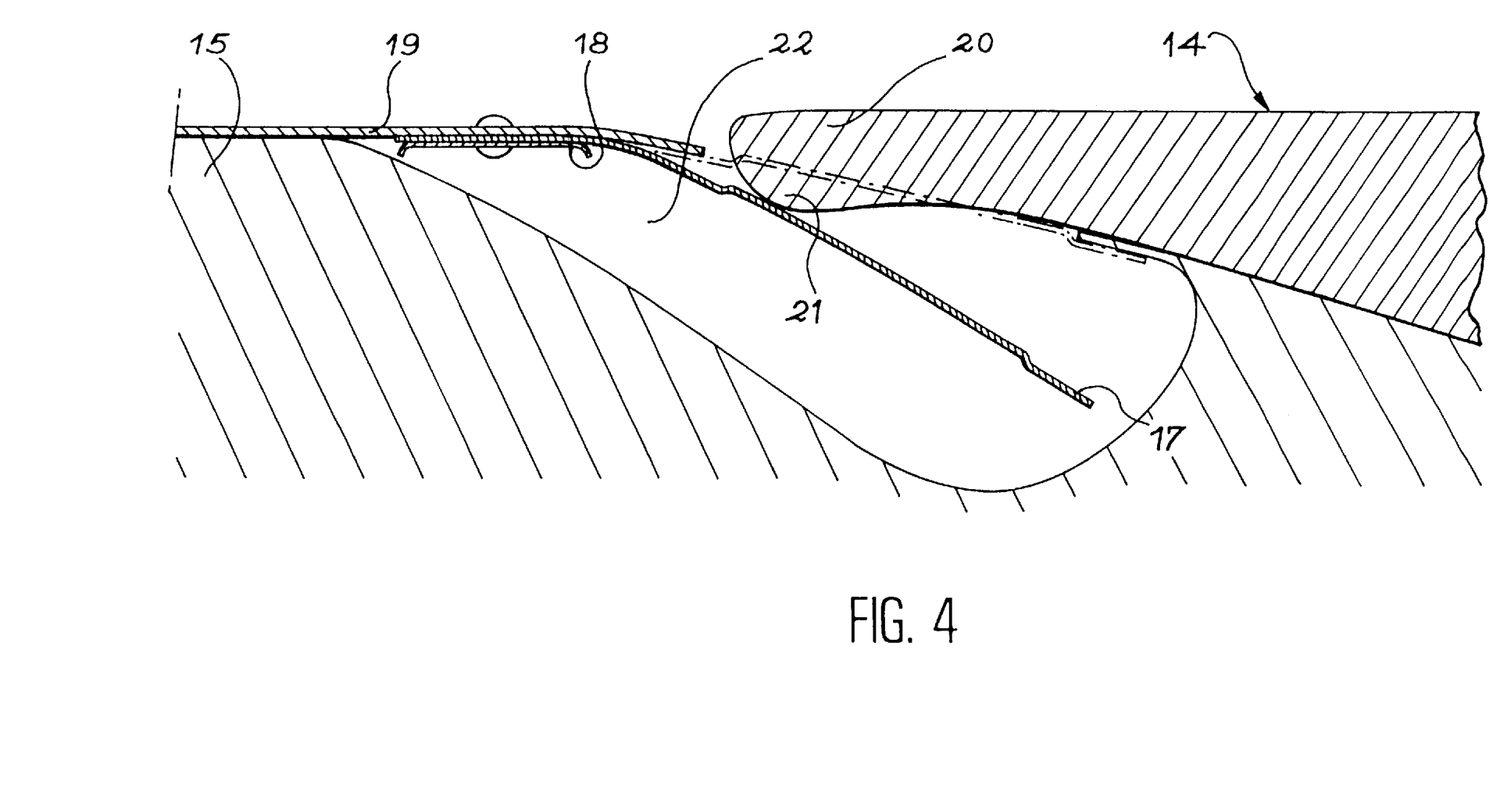
FIG. 4 illustrates a construction detail

Finally, a system has also been provided that includes "louvers", that is to say rotating doors that are different to the previous ones, directed at an angle towards the inside of the working section in the open position and which do not extend outside the nacelle: therefore they do not create any appreciable drag force but do have several disadvantages, which will be explained with the help of FIGS. 1 and 2 which allow this air inlet system and its characteristics to be understood. The nacelle 1 isolating the working section 2 from the outside 3 is interrupted over a part of its surface area and its continuity is re-established by the air admission system 4. The louvers bear reference number 5 and a sliding ramp, situated in front of the louvers 5, bears reference number 6. The louvers 5 are in the form of blades appreciably thinner than the nacelle 1 and extend in a way that forms a continuation of the external surface of the nacelle by being in contact with it through the ends in the closed position represented on this Figure; the ramp 6 then occupies its extreme back position. This is no longer the situation in FIG. 2 where the louvers 5 have turned about their axis of rotation, situated towards the front and have then tilted towards the working section 2, which defines passages 8 behind them and between them. Furthermore, the ramp 6 has moved forward to open up another passage 9 in front of the closest louver 5 and as the edge 40 of the ramp 6 is tapered towards the back, its external surface receding towards the working section 2, the air outside is then guided towards the working section. The position in FIG. 2 is used for low aircraft speeds. When the speed becomes greater, the strength of the louvers 5 which are rather thin and ordinarily rather long becomes a problem which requires them to be closed again taking up the position in FIG. 1 and a cross section for the passage of air that is acceptable is re-established by moving the ramp 6 forward.

It can be seen that the operation of this device, where the addition of the ramp 6 is necessary, is complicated and requires a particular command mechanism to be used. Furthermore, the abandonment of the air guidance that is provided by the scoops outside the working section makes it necessary to increase the area of the opening in order to encourage a sufficient flow of air to pass through it: one is therefore led into using several louvers 5 of large angular extension (78° in one particular design) which makes them fragile and gives them large bulges, which means that their rotation is accompanied by significant translation movements, above all in the middle. One is therefore lead into leaving gaps between the louvers 5 in all positions, even in the closed position of FIG. 1 in order to avoid jamming on rotation, with the consequence that the efficiency and the acoustic unobtrusiveness of the motor are compromised. Finally, the louvers must be thin, which does not allow the continuity of the profile of the nacelle 1 to be respected: FIG. 1 shows that the working section 3 is formed with a pocket 7 in front of them; the flow of air can no longer be uniform even when the louvers 5 are closed.

The object of the invention is to get away from the disadvantages of these different systems as much as possible while retaining certain of their advantages. In particular, it allows one to provide effective guidance of the air into the working section and hence a satisfactory additional air flow, when the air admission system is open, while also re-establishing a smooth internal and external profile for the nacelle when it is closed. Furthermore, this admission system is simple in its constitution and is simple to control and it is not fragile. Finally, good diversion of the air into the working section is not accompanied by a high drag force.

To summarise, this invention in its most general form relates to a system for admitting air into a working section of a gas turbine engine through openings in a jacket lateral to the working section, that can be closed again by movable doors that include doors on the nacelle that slide forward in order to clear the openings and rotating doors articulated on the jacket by a rear hinge and turning out from the working section in order to clear the openings, characterised in that the sliding and rotating doors have the thickness of the jacket except for overlapping joining portions at an area where the doors connect, where the sliding doors are tapered receding towards the inside and the rotating doors are tapered receding towards the outside, the sliding doors having a straight external surface and the rotating doors a straight internal surface.

The rotating doors, analogous to the scoops of the prior art that open towards the outside do not appear to have been combined previously with sliding ramps except in thrust systems where they are opened to cause the air to go out of the working section and to send it back in towards the front in order to slow the aircraft down which is a situation that is totally different. This combination allows a satisfactory air input to be maintained at high aircraft speeds: it is, in effect possible to half close the scoops and to thereby reduce their drag force without excessively reducing the flow of air going into the working section since the ramps remain open; the smaller amount of guidance from the scoops is therefore compensated by an opening that is larger than if the scoops had been used alone. Furthermore, this system lends itself to simple and simultaneous control of scoops and ramps, which is contrary to the combined design shown in FIGS. 1 and 2 where the relationship between the movement of the louvers and of the ramp is complex. Furthermore, perfect continuity of the internal and external surfaces of the jacket is maintained when the door system is closed, which prevents irregularities in the air flow over these surfaces and hence energy losses through friction and turbulence.

According to one development, the rotating doors have a front edge with a protuberance directed towards the working section, and the sliding doors have a cavity that extends in front of the protuberance when the doors are closed, as well as a seal consisting of an elastic strip with a front edge fixed to the sliding doors and the free part capable of bending under the protuberance and covering the cavity and which straightens itself out when the openings are cleared, which allows a good seal to be provided for the jacket when the doors are closed and a good flow of air going into the working section when they are open. Finally a simple and effective command mechanism for the doors includes, between the rotating doors and the sliding doors, arms dependent on the sliding doors, surrounding the rotating doors and carrying grooves in which the runners mounted on the sides of the rotating doors slide, the grooves having a part that is inclined towards the rear and towards the outside.

The invention will be better understood with the help of the following Figures, which are appended for illustrative purposes only and which are nonlimitative.

From now on the description will be directed towards FIGS. 3 to 9 in that order. The nacelle carries reference number 10 with the invention, the working section for the flow of gases, reference number 11 and the outside, reference number 12. The air admission system 13 is made up of scoops (rotating doors) 14 and ramps (sliding doors) 15 in front of the preceding ones, which have the thickness of the nacelle 10 at their opposing portions and which both taper at the joining portions which overlap at the site of a connecting region 16 which is provided in the closed condition illustrated in FIG. 3, where the scoops 14 are tapered receding towards the outside 12 and the ramps 15 receding towards the working section 11; but as the external surface of the scoops 14 remains straight right to the end, which allows the smooth aspect of the nacelle to the outside 12 to be preserved and as the ramps 15 have an internal straight surface which preserves the smooth aspect of the nacelle 10 in front of the working section 11, no obstacle to the flow of the gases is created. Although the overlap of the components at the connecting area 16 is good, a sealing system illustrated in detail in FIG. 4 has been provided which consists of an elastic strip 17, the front edge 18 of which is riveted to a small plate 19 integral with the ramp 15 and the free part of which bends under the pressure from the leading edge 20 of the scoop 14. As the small plate 19 extends almost to the leading edge 20, there is only a thin interstitial space between them, which additionally, is blocked by the seal 17. It may be noted in passing that the leading edge 20 is not tapered as is usual, with a rounding off at a small constant radius at the end, but contrary to this has a bulbous cross section, with a protuberance 21 directed towards the working section 11 (and against which the seal 17 rests), and that this protuberance 21 has a constant radius over about a quarter of a circle directed towards the working section 11 and towards the front, and which is in practice discontinued at a sharp angle where it connects with the external surface of the scoop 14. This construction allows much more effective admission of air which will flow along the protuberance 21 with much reduced boundary layer separations compared with the usual leading edge shape of the doors. The door 15 and the scoop 14 are substantially contiguous in the closed position of the admission system, except in front of the protuberance 21 where the door 15 shapes a cavity 22 in which the seal 17 is housed.

Figure 5:
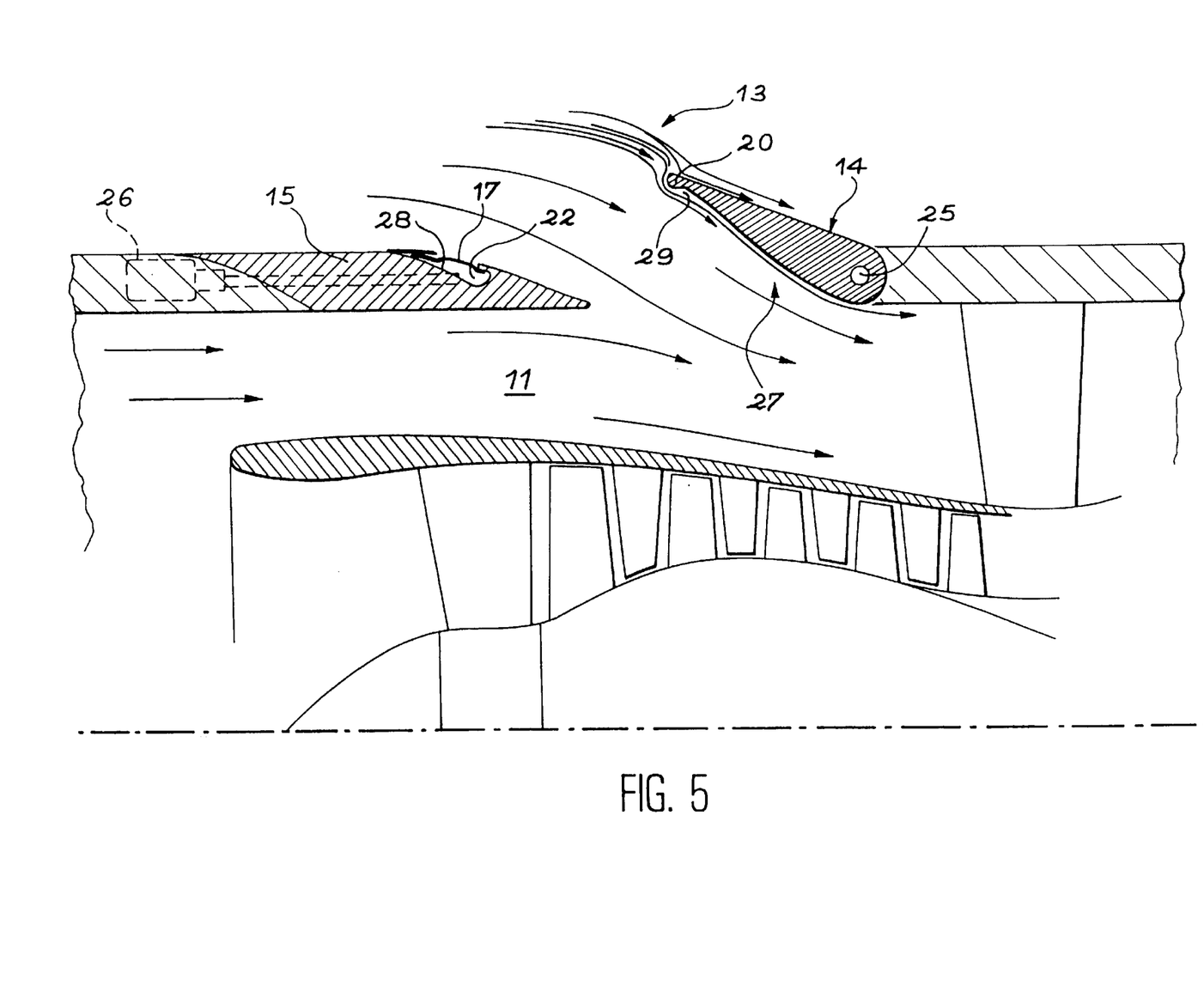
FIG. 5 illustrates the air admission system in the open condition.

The open position of the air admission system 13 has been represented in FIG. 5: the scoops 14 have pivoted about a rear hinge 25 and the ramps 15 have slid towards the front, driven by a linear motor 26 or any other equivalent system. The conjunction of these movements has produced an opening 27 to the working section 11 of quite large surface area, and the receding surfaces of the scoops and ramps 14 and 15, which are all inclined towards the working section 11 by being directed towards the rear, encourage the admission of the air. As has already been mentioned, the angle of opening of the scoops 14 is progressively reduced when the speed of the aircraft increases by further moving the ramps 15, so as to regulate the flow of air. For explanatory reasons, an area 29 has also been shown, situated under the leading edge 20 of the scoops 14 in which no flow is produced because of boundary layer separations at this site. The required movements of the ramps 15 are much reduced compared with a leading edge which does not have the protuberance 21. Finally, the seal 17 is straightened out and completely covers the cavity 22, which provides an external profile to the door 15.

Figure 6:
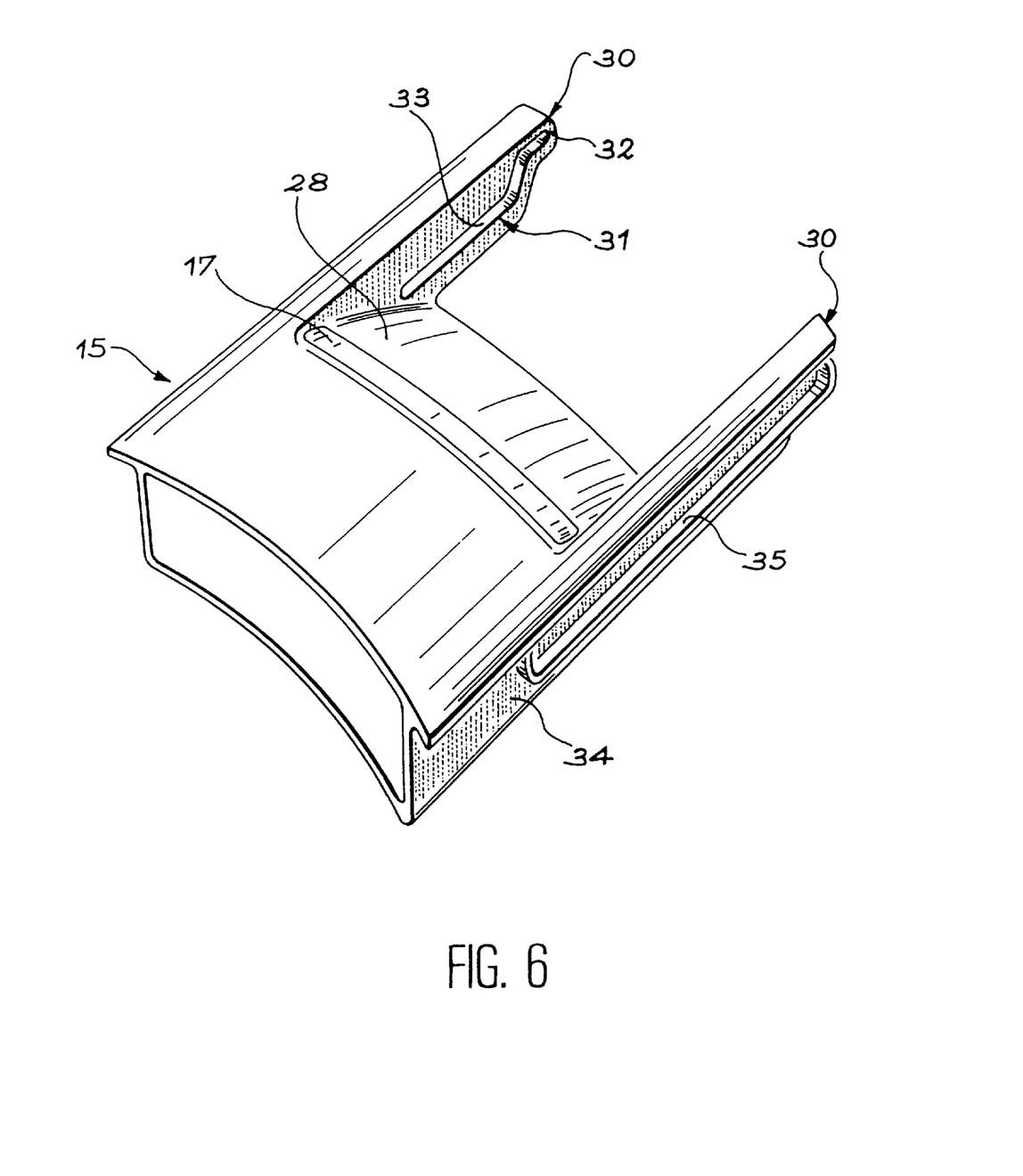
FIG. 6 represents an isolated ramp.
Figure 7:
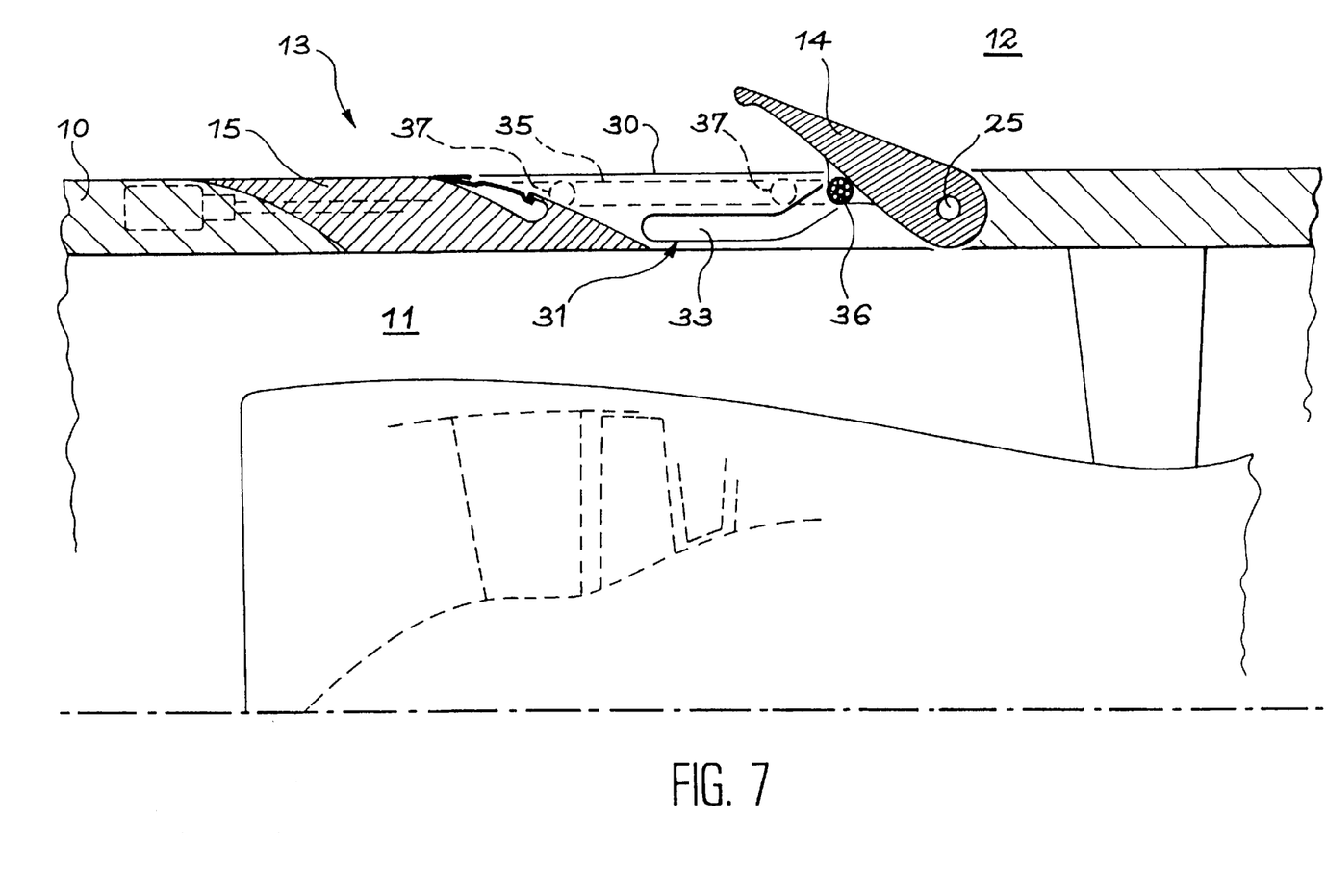
FIG. 7 represents the connection mechanism of a ramp and a door.

Synchronisation of the movements of the doors 14 and the ramps 15 is achieved thanks to arms 30 situated on the latter and which laterally surround the scoops 14. They extend to the rear of the area 28 on both its sides, and have a groove 31 cut into them on their internal surface 32 directed towards the scoop 14; the grooves 31 are slanted over at least a part of their length and have an ascending part 33 towards the end of the arms 30. Their external surface 34 moreover has a rectilinear groove 35 cut into it. If the doors 14 are fitted with wheels 36 that run in the grooves 31, as shown in FIG. 7, it can be seen that movement of the ramps towards the front causes elevation of the scoops 14 as soon as the wheels 36 reach the ascending parts 33 of the grooves 31. Other wheels 37, which are mounted on the nacelle 10, run in the rectilinear grooves 35 in the external surface 34 and therefore support the ramp 15.

Figure 8:
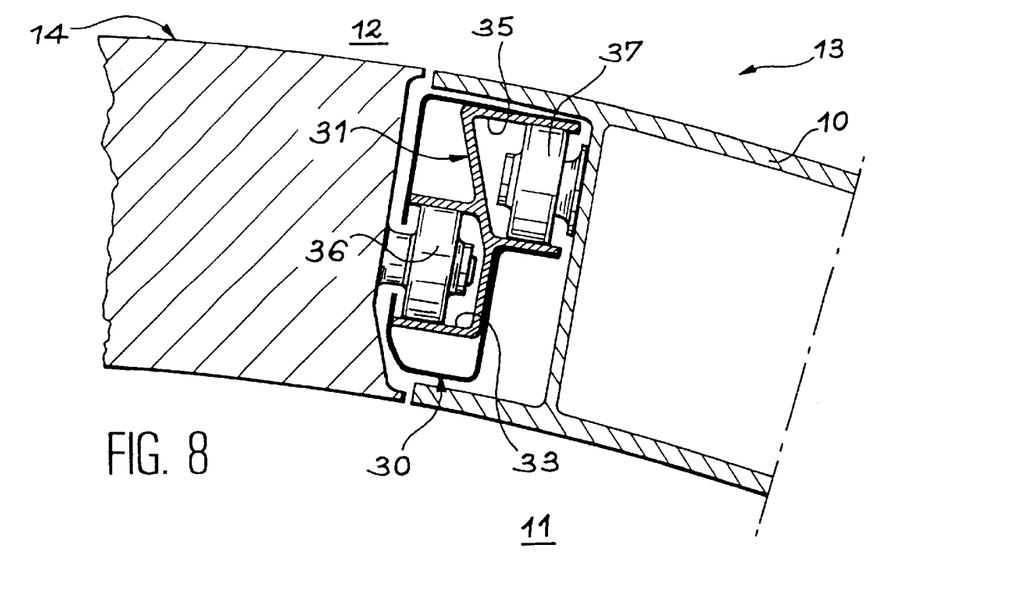
FIGS. 8 and 9 represent the connection mechanism of a ramp and a door in another direction and according to two different conditions.
Figure 9:
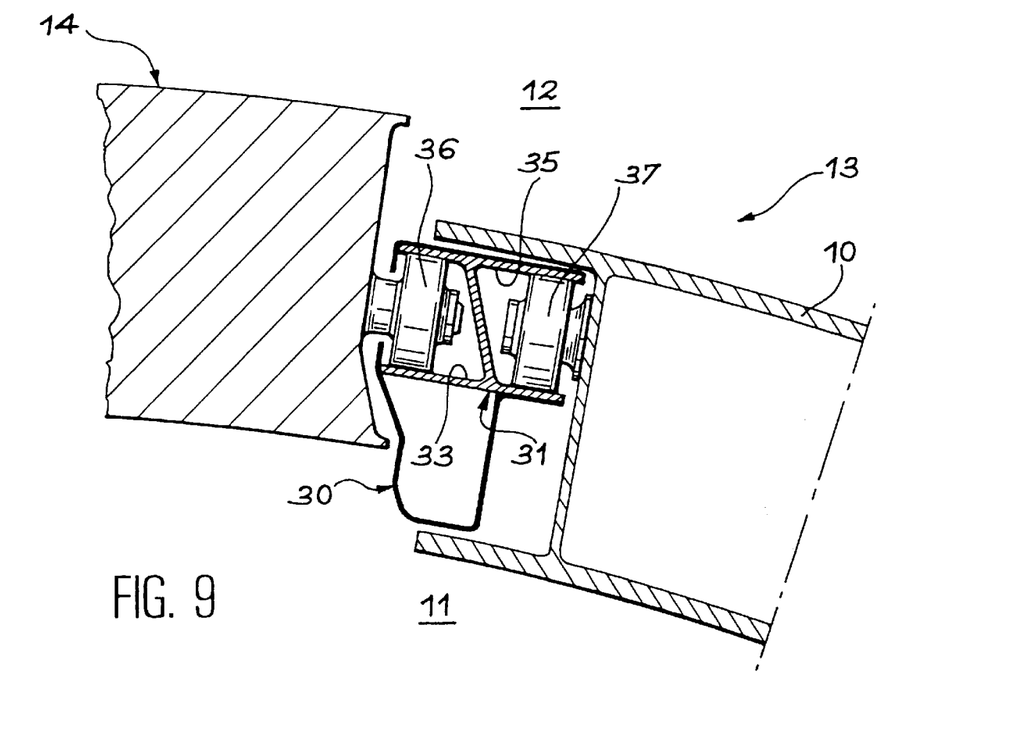
Figure 10:
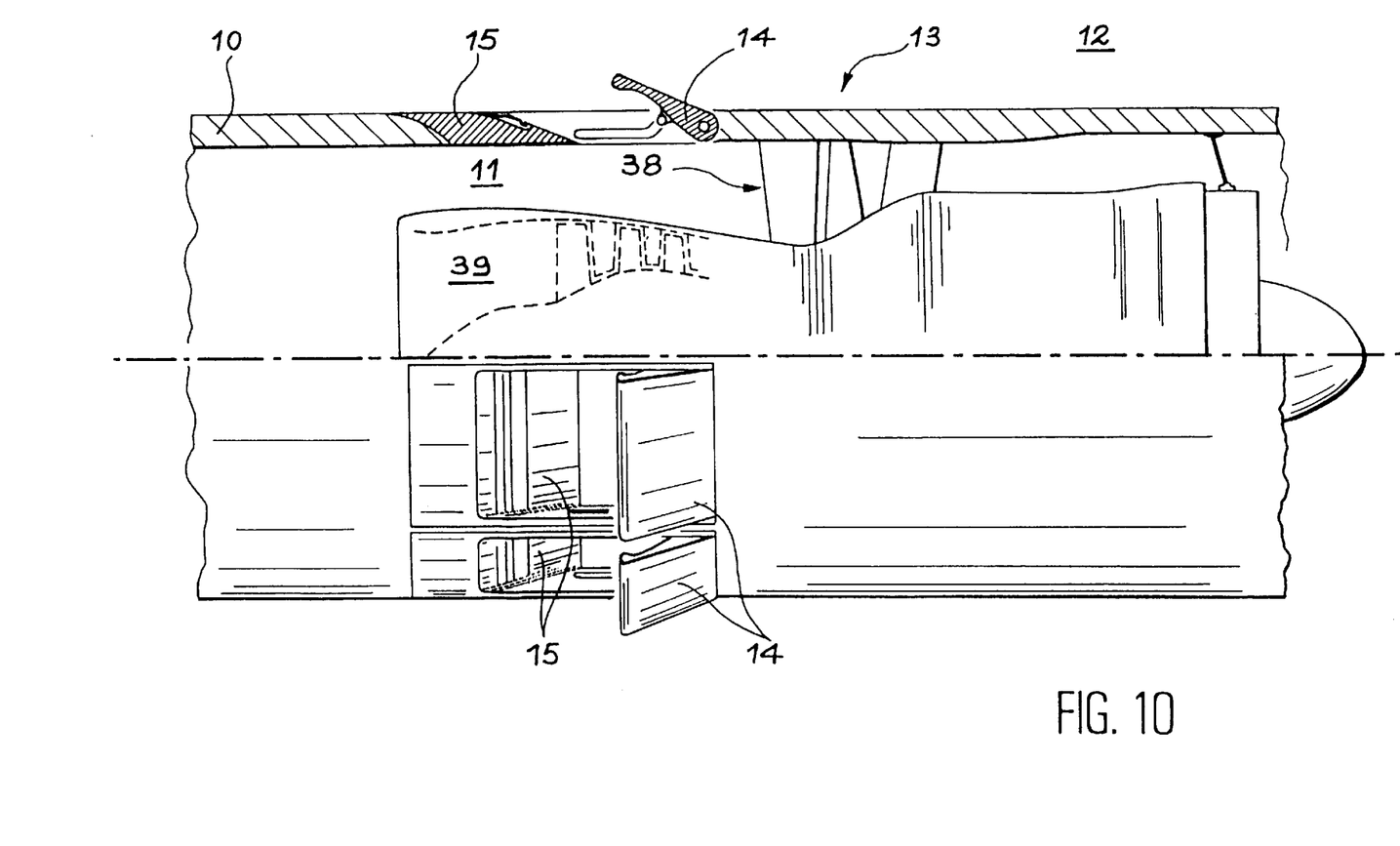
FIG. 10 is a more general view of the engine.

FIG. 8 illustrates the relative position of wheels 36 and 37 when the scoops 14 are closed, and FIG. 9 their relative position when the scoops 14 are open. Finally, FIG. 10 allows a more complete representation of the invention on the nacelle 10: the system described up to now is positioned on relatively short angular sectors and with a few examples over the circumference of the nacelle 10. The working section 11 is an external working section occupied by the blades of a fan 38, which also extends into an internal working section 39 surrounded by the previous one and constituting the main working section for the engine's gas flow. The system of the invention therefore provides an additional flow of air to the fan 38 when it is open, without increasing the diameter of the nacelle.

What is claimed is:

1. System for admitting air into a working section of a gas turbine engine through openings in a lateral jacket (10) of the working section that can be closed by moving doors that include doors (15) sliding on the nacelle towards the front in order to clear the openings and rotating doors (14) articulated on the jacket by a rear hinge (25) and turning outside of the working section in order to clear the openings, characterised in that the sliding and the rotating doors have the thickness of the jacket except for the overlapping joining portions in a region (16) where the doors connect, where the sliding doors are tapered receding towards the inside, the rotating doors are tapered receding towards the outside, the sliding doors having a straight external surface and the rotating doors a straight internal surface.

2. An air admission system according to claim 1, characterised in that the rotating doors (14) have a front edge with a protuberance (21) directed towards the working section, and the sliding doors have a cavity (22) extending in front of the protuberance (21) when the openings are closed, and a seal (17) in the form of an elastic strip with a front edge fixed to the sliding doors and a free part capable of bending under the protuberance (21) and of covering the cavity (22) by straightening out when the openings are cleared.

3. An air admission system according to claim 1, characterised in that it includes mechanical linkage means between the sliding and rotating doors consisting of arms dependent on the sliding doors (15), surrounding the rotating doors (14) and having grooves (33) in which runners (36) mounted on the sides of the rotating doors (14) slide, the grooves having a part inclined towards the rear and towards the outside (33).

* * * * *